(12) United States Patent
Kwon et al.

(10) Patent No.: US 7,974,045 B2
(45) Date of Patent: Jul. 5, 2011

(54) APPARATUS AND METHOD FOR A PIEZOELECTRIC MICRO-ACTUATOR FOR A HARD DISK DRIVE

(75) Inventors: Hae-sung Kwon, San Jose, CA (US); Hyung Jai Lee, Cupertino, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1126 days.

(21) Appl. No.: 11/480,339

(22) Filed: Jun. 29, 2006

(65) Prior Publication Data

US 2008/0002305 A1 Jan. 3, 2008

(51) Int. Cl.
*G11B 5/56* (2006.01)
(52) U.S. Cl. ..................................... 360/294.4
(58) Field of Classification Search .............. 360/294.4, 360/245.6, 245.4, 245.3
See application file for complete search history.

(56) References Cited

U.S. PATENT DOCUMENTS

| | | | |
|---|---|---|---|
| 5,189,578 A | 2/1993 | Mori et al. | |
| 5,199,090 A * | 3/1993 | Bell ................ | 385/33 |
| 5,282,190 A | 1/1994 | Maruo et al. | |
| 5,745,319 A | 4/1998 | Takekado et al. | |
| 5,757,573 A | 5/1998 | Tokuyama et al. | |
| 5,764,444 A | 6/1998 | Imamura et al. | |
| 5,802,914 A | 9/1998 | Fassler et al. | |
| 5,867,347 A | 2/1999 | Knight et al. | |
| 5,943,189 A | 8/1999 | Boutaghou et al. | |
| 6,188,548 B1 | 2/2001 | Khan et al. | |
| 6,246,552 B1 | 6/2001 | Soeno et al. | |
| 6,268,983 B1 | 7/2001 | Imada et al. | |
| 6,362,933 B1 | 3/2002 | Sampietro et al. | |
| 6,545,846 B1 | 4/2003 | Chee et al. | |
| 6,671,131 B2 * | 12/2003 | Kasajima et al. ........ | 360/294.4 |
| 6,747,848 B2 * | 6/2004 | Kasajima et al. ........ | 360/245.3 |
| 7,057,857 B1 * | 6/2006 | Niu et al. ................ | 360/245.4 |
| 7,518,833 B2 * | 4/2009 | Yao ........................ | 360/294.4 |
| 7,554,772 B2 * | 6/2009 | Yao et al. ............... | 360/294.3 |
| 7,660,079 B2 * | 2/2010 | Yao et al. ............... | 360/294.3 |
| 2005/0286176 A1 * | 12/2005 | Yao et al. ............... | 360/294.4 |
| 2006/0050442 A1 * | 3/2006 | Yao et al. ............... | 360/294.4 |
| 2007/0097553 A1 * | 5/2007 | Yao ........................ | 360/294.4 |
| 2007/0139825 A1 * | 6/2007 | Yao et al. ............... | 360/294.4 |

* cited by examiner

*Primary Examiner* — Angel A. Castro

(57) ABSTRACT

Micro-actuator assembly including micro-actuator mount coupled to micro-actuator bridge to provide merged footprint with slider and micro-actuator bridge gap. Flexure finger including micro-actuator assembly for coupling to slider. Head gimbal assembly including flexure finger coupled to the slider. A head stack assembly including at least one of the head gimbal assemblies coupled to a head stack. Hard disk drive including head stack assembly. The invention includes manufacturing the micro-actuator assembly, the flexure finger, the head gimbal assembly, the head stack assembly, and the hard disk drive, as well as these items as products of the invention's manufacturing processes.

19 Claims, 8 Drawing Sheets

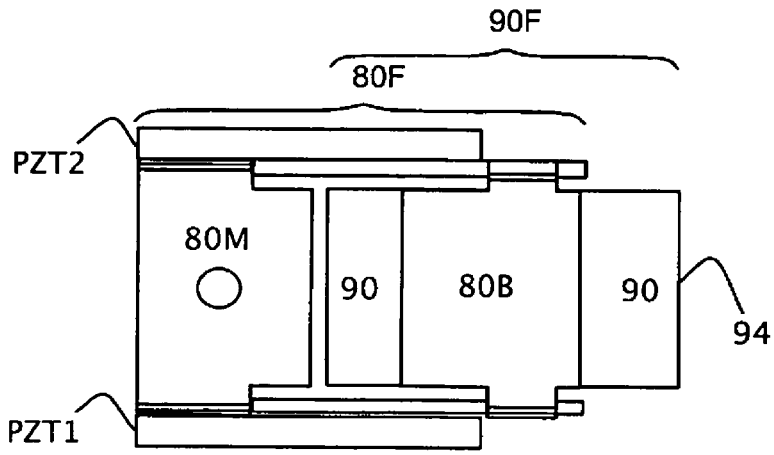
Fig. 1A
Prior Art
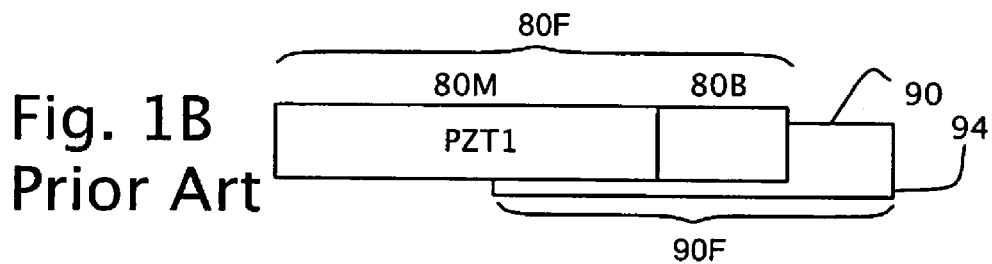
Fig. 1B
Prior Art
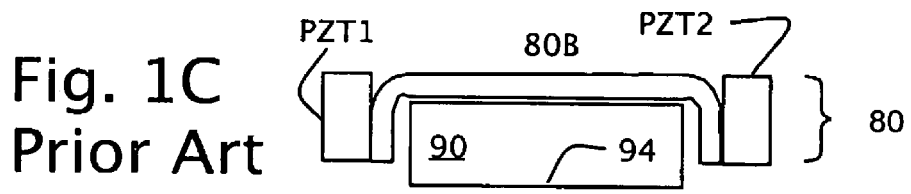
Fig. 1C
Prior Art
Fig. 1D Prior Art
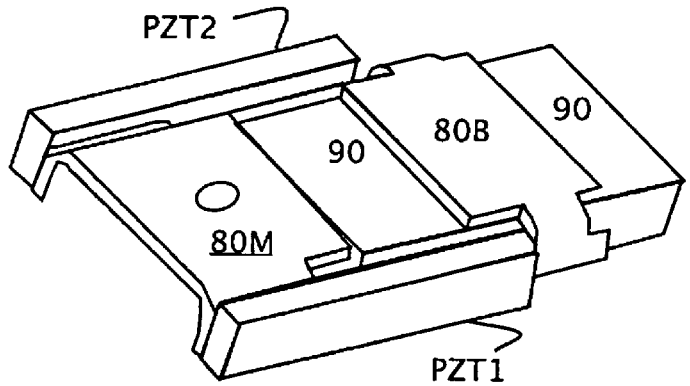

US 7,974,045 B2

APPARATUS AND METHOD FOR A PIEZOELECTRIC MICRO-ACTUATOR FOR A HARD DISK DRIVE

TECHNICAL FIELD

This invention relates to hard disk drives, in particular, to apparatus and methods for controlling the positioning of the read-write head above a rotating disk surface in a hard disk drive through the use of micro-actuator assemblies employing a piezoelectric effect.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access the data stored of the track.

Micro-actuators provide a second actuation stage for lateral positioning the read-write head during track following mode. They often use a piezoelectric effect to rapidly make fine position changes. They have doubled the bandwidth of servo controllers and are believed essential for high capacity hard disk drives from hereon. The inventors have found certain problems associated with previous micro-actuators, which has lead them to make this invention's improvements.

SUMMARY OF THE INVENTION

The invention's micro-actuator assembly includes a micro-actuator mount for mechanically coupling to a slider and a micro-actuator bridge collectively providing a micro-actuator footprint merged with the slider footprint of the slider and further providing a micro-actuator bridge gap between the slider and the micro-actuator mount over the micro-actuator bridge. This micro-actuator has improved dynamics over existing piezoelectric micro-actuators. First, by enforcing the micro-actuator bridge gap, the invention's head gimbal assembly has higher pitch and higher roll stiffness than previous head gimbal assemblies. Second, by merging the slider and micro-actuator footprints, the pitch torque of the head gimbal assembly is minimized.

The slider, and its read-write head may include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the vertical micro-actuator.

The invention's flexure finger includes the invention's micro-actuator assembly for mechanically coupling to an embodiment of the slider. The flexure finger may include a vertical control signal path providing the vertical control signal to a heating element in the vertical micro-actuator of the slider. The micro-actuator assembly may aid in lateral positioning, and may further aid in vertical positioning of the read-write head over the data of the rotating disk surface.

The invention also includes a head gimbal assembly including the invention's flexure finger coupled to the slider, which further includes the micro-actuator assembly mechanically coupled to the slider and may further include the vertical control signal path electrically coupled to the vertical control signal of the slider. The invention includes a head stack assembly including at least one of the head gimbal assemblies coupled to a head stack. The invention includes a hard disk drive including a head stack assembly, which includes at least one of the head gimbal assemblies.

The invention includes manufacturing the slider, the flexure finger, the head gimbal assembly, the head stack assembly, and the hard disk drive, as well as these items as products of the invention's manufacturing processes.

BRIEF DESCRIPTION OF THE DRAWINGS

FIGS. 1A to 1D show an example prior art micro-actuator assembly mechanically coupled to a prior art slider;

DETAILED DESCRIPTION

Figure 2A:
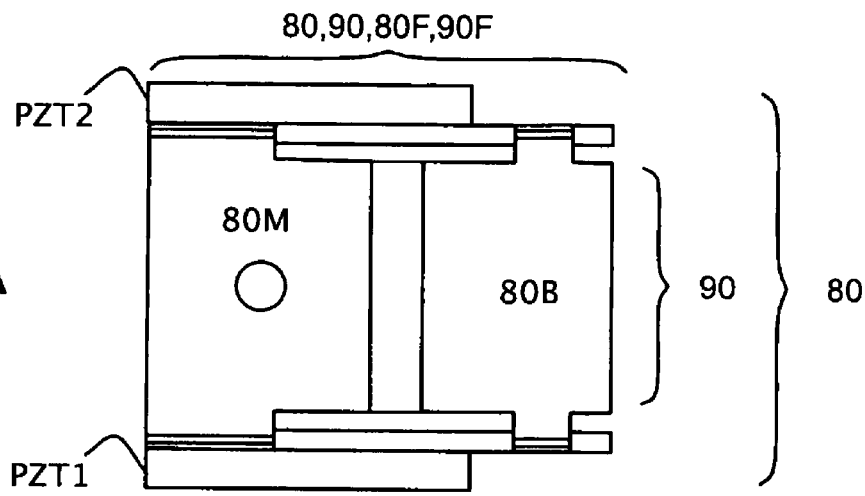
FIGS. 2A to 2D show some aspects of the invention's micro-actuator assembly mechanically coupled to a slider.

This invention relates to hard disk drives, in particular, to apparatus and methods for controlling the positioning of the read-write head above a rotating disk surface in a hard disk drive through the use of micro-actuator assemblies employing a piezoelectric effect.

The invention's micro-actuator assembly 80 includes a micro-actuator mount 80M for mechanically coupling to a slider 90 and a micro-actuator bridge 80B collectively providing a micro-actuator footprint 80F merged with the slider footprint 90F of the slider and further providing a micro-actuator bridge gap 80G between the slider and the micro-actuator mount over the micro-actuator bridge, as shown in FIGS. 2A to 2D, and 3B. This micro-actuator has improved dynamics over existing piezoelectric micro-actuators shown in FIGS. 1A to 1D, and 3C. First, by enforcing the micro-actuator bridge gap, the invention's head gimbal assembly 60 has higher pitch and higher roll stiffness than previous head gimbal assemblies. Second, by merging the slider and micro-actuator footprints, the pitch torque of the head gimbal assembly is minimized in the hard disk drive 10. The preferred thickness of the micro-actuator bridge gap is preferably about the thickness of the frame, or put another way, the thickness of the metal forming the micro-actuator mount 80M. As used herein, pitch will be measured with respect to the rotating disk surface 120-1. as used herein, roll stiffness refers to the slider/ micro-actuator/head gimbal assembly interaction and is often measured with respect to the rotating disk surface and the track 122 being followed.

Before discussing the micro-actuator 80, the flexure finger 20, and the rest of the head gimbal assembly 60, the slider 90 will be considered.

Figure 4A:
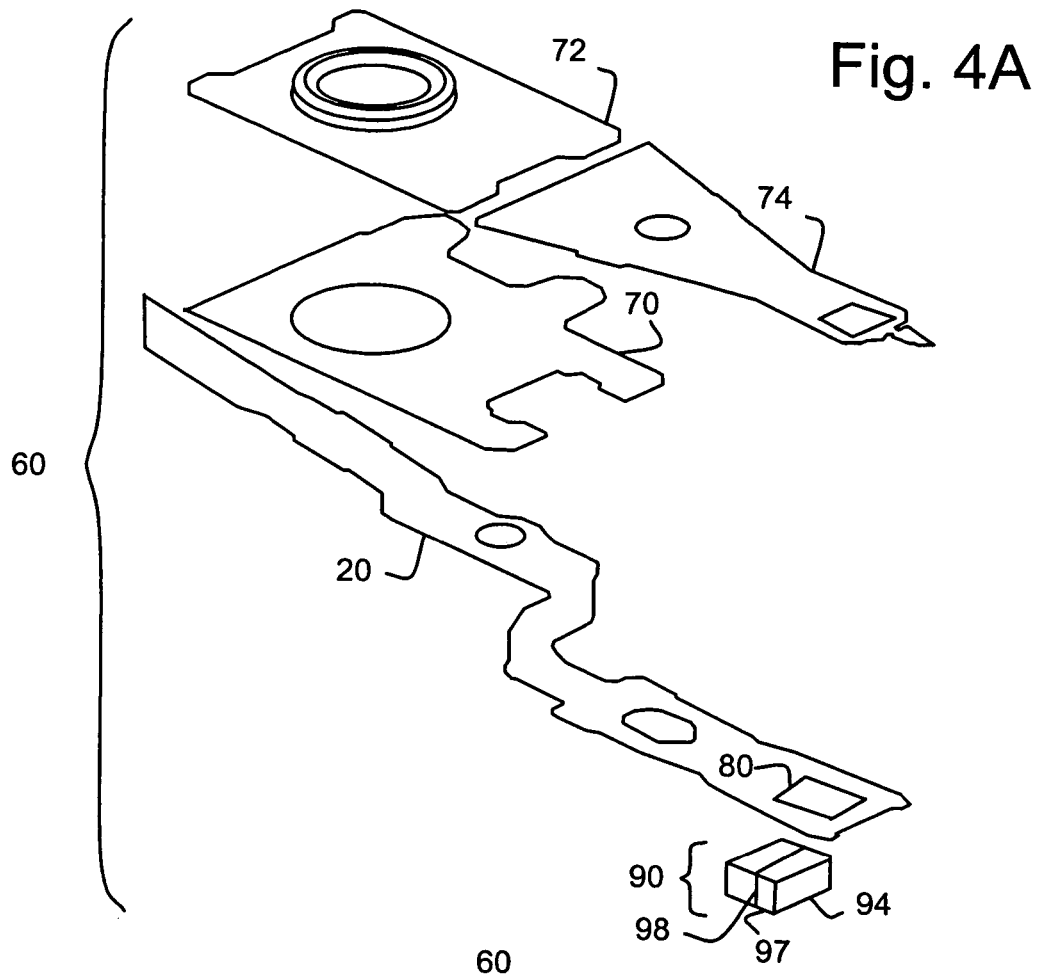
FIGS. 4A and 4B show some aspects of the head gimbal assembly of FIGS. 3A and 3B.
Figure 4B:
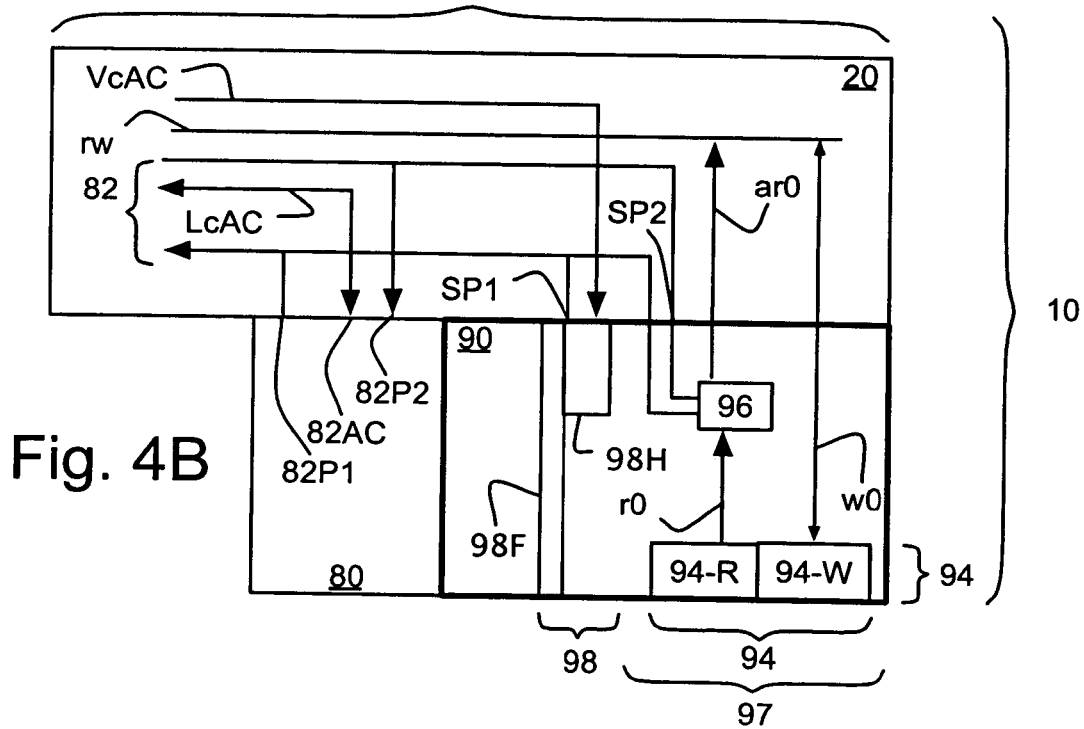

The slider 90 may preferably contain a vertical micro-actuator 98, perpendicular to the air bearing surface 92 and coupled with a deformation region 97, which includes the read-write head 94, as shown in FIGS. 4A and 4B. The vertical micro-actuator 98 may include a heating element 98H, and stimulated by a vertical control signal VcAC providing a potential difference with a first slider power terminal SP1, to alter a vertical position VP of the read-write head over the rotating disk surface 120-1 in a hard disk drive 10.

The heating element 98H may be coupled with a shape memory alloy film 98F. Whenever the temperature of the film is below a first temperature, the film configures in a first solid phase to the deformation region to create the vertical position Vp of the read-write head above the rotating disk surface 120-1. Whenever the temperature of the film is above the first temperature, the film configures in a second solid phase to the deformation region increasing the vertical position of the read-write head above the rotating disk surface.

The vertical control signal stimulates the vertical micro-actuator to increase the vertical position by stimulating the heating element to increase the temperature of the shape memory alloy film, which when it is above the first temperature the film configures in the second solid phase to the deformation region, increasing the vertical position.

The first temperature may be selected differently for the slider 90 including the heating element 98H coupled with the shape memory alloy film 98F from the slider including just the shape memory alloy film. Alternatively, the first temperature may be selected as the same for both slider embodiments. In certain preferred embodiments, the first temperature may be between fifty five and sixty five degrees Centigrade. The temperature of the shape memory alloy film being above the first temperature may include the temperature being greater than the first temperature, or alternatively, the temperature may be greater than or equal to the first temperature. Similarly, the temperature being below the first temperature may include, the temperature less than or equal to the first temperature, or alternatively, the temperature less than the first temperature.

A shape memory alloy as used herein is a solid material having two solid phases, so that when subjected to changes in temperature or pressure, the material tends to go from the first solid phase to the second or from the second solid phase to the first. A shape memory alloy of two or more elements will refer to any molecular or crystalline combination of those elements which is a solid possessing the shape memory property of two solid phases in the operating and storage conditions of a hard disk drive.

The shape memory alloy may include at least one member of the titanium nickel shape memory alloy group consisting of: a Titanium Nickel (TiNi) alloy, a Titanium Nickel Iron (Ti—Ni—Fe) alloy, a Titanium Nickel Copper (Ti—Ni—Cu) alloy, a Titanium Nickel Lead (Ti—Ni—Pb) alloy, and a Titanium Nickel Hafnium (Ti—Ni—Hf) alloy.

The slider, and its read-write head may further include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the vertical micro-actuator.

The slider 90 is used to access the data 122 on the rotating disk surface 120-1 in a hard disk drive 10. The data is typically organized in units known as a track 122, which are usually arranged in concentric circles on the rotating disk surface centered about a spindle shaft 40 and alternatively may be organized as joined spiral tracks. Operating the slider to read access the data on the rotating disk surface includes the read head 94-R driving the read differential signal pair r0 to read access the data on the rotating disk surface. The read-write head 94 is formed perpendicular to the air bearing surface 92 to the amplifier 96.

The read head 94-R may use a spin valve to drive the read differential signal pair. As used herein, the spin valve employs a magneto-resistive effect to create an induced sensing current Is between the first shield Shield1 and the second shield Shield2. Spin valves have been in use the since the mid 1990's.

The read head 94-R may use a tunnel valve to drive the read differential signal pair. As used herein, a tunnel valve uses a tunneling effect to modulate the sensing current Is perpendicular to the first shield Shield1 and the second shield Shield2. The use of perpendicular polarization of the data 122 on a rotating disk surface 120-1 lead to the announcement of a large increase in data density, a jump of almost two hundred percent in the spring of 2005. The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the rotating disk surface 120-1, results in a change of electrical resistance through the tunnel valve.

Figure 8A:
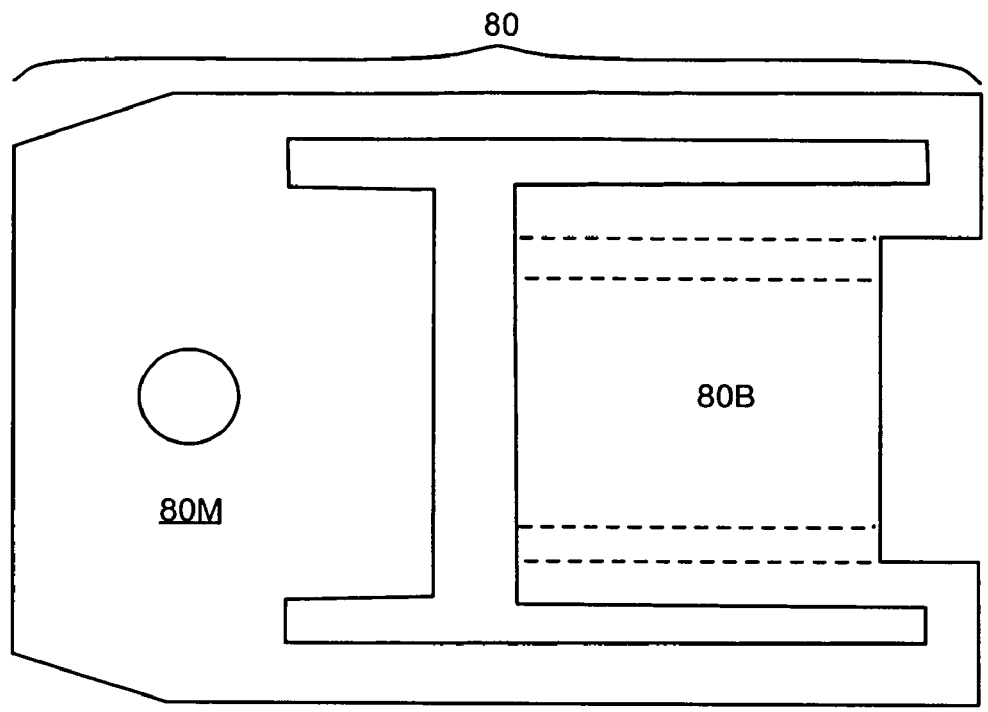
FIG. 8A shows some example details of the micro-actuator assembly of FIG. 2A to 3B.
Figure 8B:
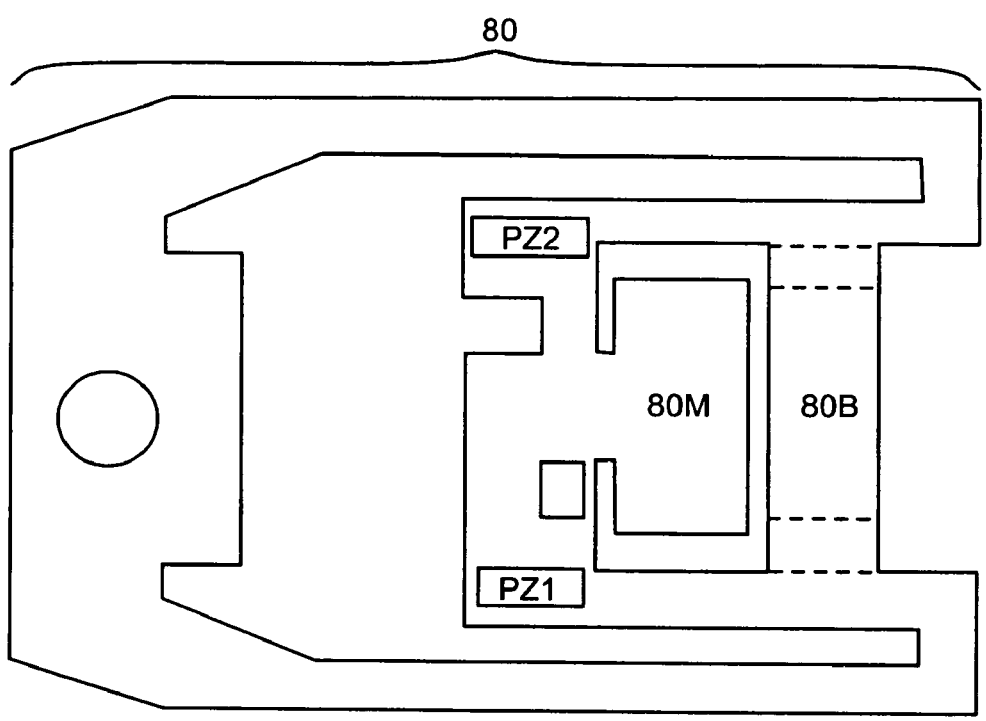
FIG. 8B shows some example details of a prior art micro-actuator assembly.

The invention's slider 90 may further include the read-write head 94 providing the read-differential signal pair r0 to the amplifier 96 to generate the amplified read signal ar0, as shown in FIG. 4B. The read-write head preferably includes a read head 94-R driving the read differential signal pair r0 and a write head 94-W receiving a write differential signal pair w0. The slider reports the amplified read signal as a result of read access of the data on the rotating disk surface. In most but not necessarily all of the embodiments of the invention's slider, the amplifier is preferably opposite the air bearing surface 92. The amplified read signal ar0 may be implemented as an amplified read signal pair ar0+− or as a single ended read signal. The vertical micro-actuator 98 included in the slider operates by inducing a strain on the deformation region 97 as well as any other materials directly coupled to it, making it preferable for the amplifier to be separated from the vertical micro-actuator and the deformation region, as shown in FIGS. 4B, 8B, and 9A. These embodiments of the invention's slider preferably include a first slider power terminal SP1 and a second slider power terminal SP2 collectively used to power the amplifier in generating the amplified read signal ar0.

Figure 5:
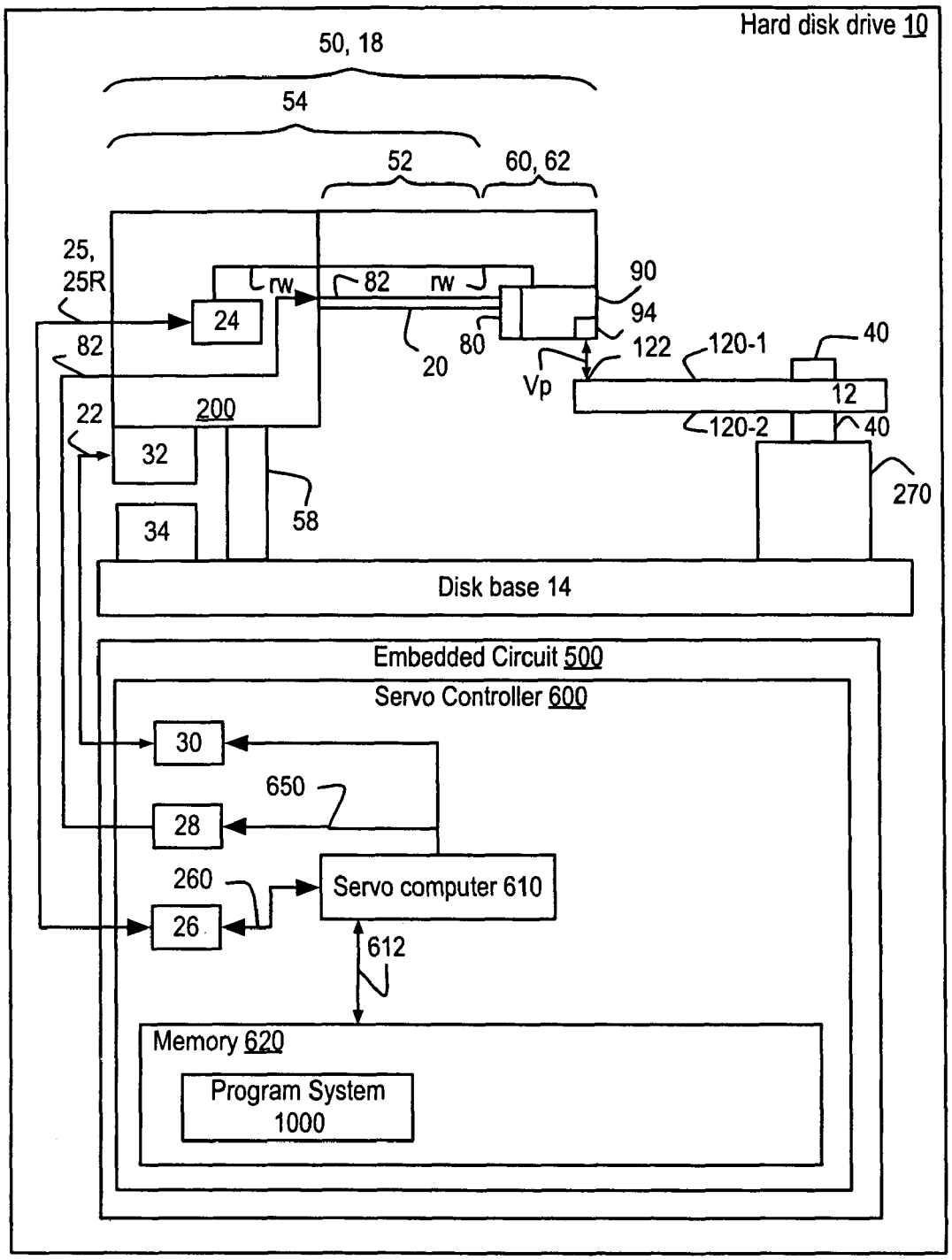
FIGS. 5 to 7 show some details of the invention's hard disk drive.

The flexure finger 20 of FIGS. 3B to 6 preferably contains the invention's micro-actuator assembly 80 for mechanically coupling to the slider 90 to aid in positioning the slider to access the data 122 on 120-1 rotating disk surface of the disk 12. The micro-actuator assembly may aid in laterally positioning LP the slider to the rotating disk surface as shown in FIG. 3A and/or aid in vertically positioning VP the slider as shown in FIGS. 1B, 1C and 5. When the slider 90 includes the vertical micro-actuator 98 with the heating element 98-H, the flexure finger 20 may further provide the vertical control signal VcAC and preferably the first lateral control signal 82P1 as the first slider power terminal SP1 to the vertical micro-actuator.

The flexure finger 20 preferably includes the lateral control signal 82 and trace paths between the slider for the write differential signal pair w0. The lateral control signal preferably includes the first lateral control signal 82P1 and the second lateral control signal 82P2, as well as the AC lateral control signal 82AC. When the slider does not contain an amplifier 96, as shown in FIGS. 1B, 1C, 2A, 5 and 6, the flexure finger further preferably provides trace paths for the read differential signal pair r0.

Figure 3A:
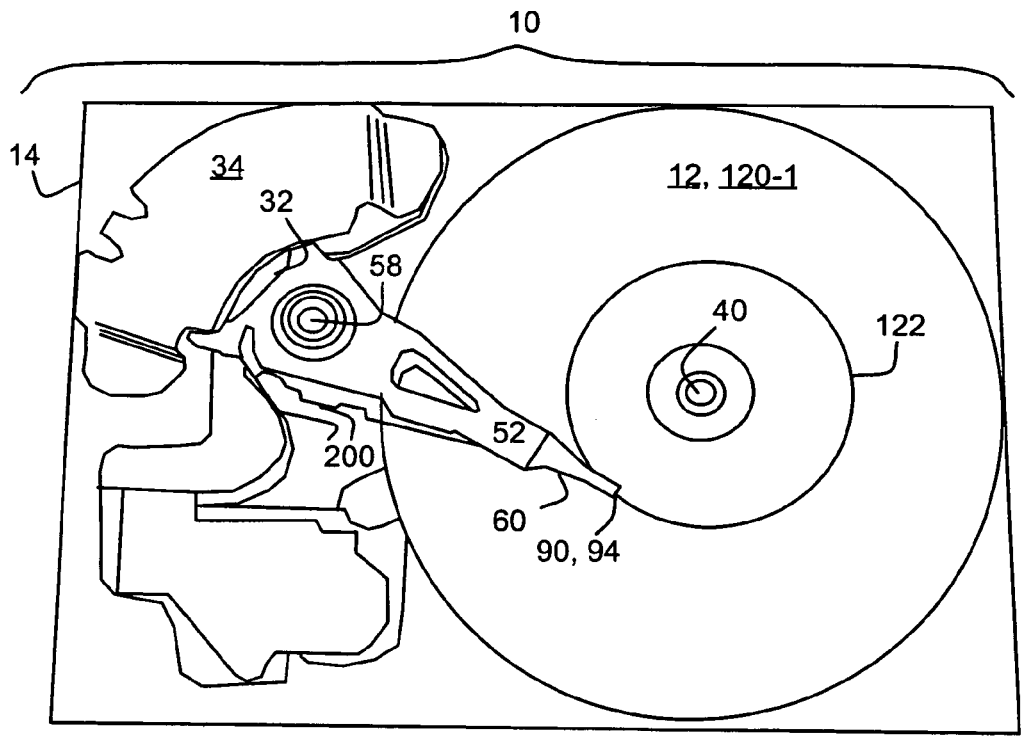
FIG. 3A shows an example of a partly assembled hard disk drive including a head gimbal assembly using the invention's micro-actuator assembly.
Figure 3B:
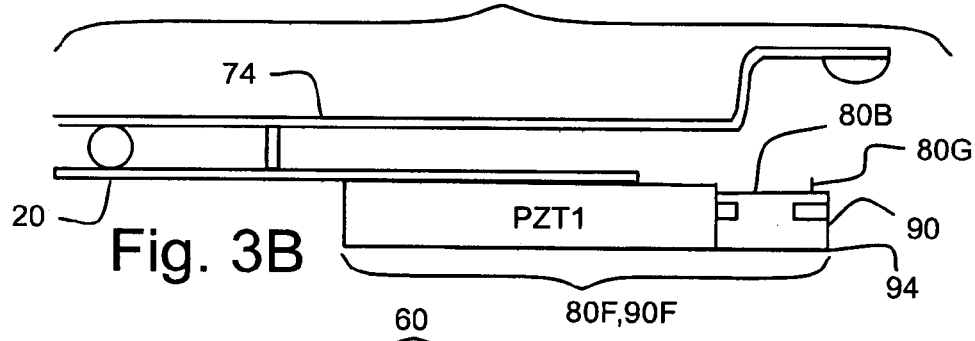
FIG. 3B shows an example of the head gimbal assembly using the invention's micro-actuator assembly.

The micro-actuator assembly 80 preferably employs a piezoelectric effect to aid in positioning the slider 90. In several embodiments of the invention the micro-actuator assembly may preferably couple with the head gimbal assembly 60 through the flexure finger 20, as shown in FIG. 3B. The micro-actuator assembly may further couple through the flexure finger to a load beam 74 to the head gimbal assembly and consequently to the head stack assembly 50.

Examples of the invention's micro-actuator assembly employing the piezoelectric effect are shown in FIGS. 2A to 2D, and 3B. FIG. 3B shows a side view of the invention's head gimbal assembly 60 with the invention's micro-actuator assembly 80 including at least one piezoelectric element PZ1 for aiding in laterally positioning LP of the slider 90 as shown in FIG. 3A. In certain embodiments, the micro-actuator assembly may consist of one piezoelectric element. The micro-actuator assembly may include the first piezoelectric element and a second piezoelectric element PZ2, both of which may preferably aid in laterally positioning the slider. In certain embodiments, the micro-actuator assembly may be coupled with the slider with a third piezoelectric element PZ3 to aid in the vertically positioning the slider above the rotating disk surface 120-1.

The flexure finger 20 may further provide a read trace path rtp for the amplified read signal ar0. The slider 90 may further include a first slider power terminal SP1 and a second slider power terminal SP2, both electrically coupled to the amplifier 96 to collectively provide power to generate the amplified read signal ar0. The flexure finger may further include a first power path SP1P electrically coupled to the first slider power terminal SP1 and/or a second power path SP2P electrically coupled to the second slider power terminal SP2, which are collectively used to provide electrical power to generate the amplified read signal.

Manufacturing the micro-actuator assembly 80 may or may not be included in the manufacturing of the flexure finger 20. The micro-actuator assembly may be formed by either a photo-etch process and/or a die stamp process, possibly creating a micro-actuator assembly template as shown in FIG. 8A as an intermediate step. The micro-actuator assembly may be bonded to a flexure finger substrate to create the flexure finger. Alternatively, die stamping may be used to form the micro-actuator assembly on the flexure finger. Additionally, photo-etching may be performed to further create the flexure finger, for instance, to create the trace paths for the read and write signals rw0, some or all of the components of the lateral control signal 82, and possibly the vertical control signal VcAC. The micro-actuator assembly is preferably formed of metal, which is further preferred to be a form of stainless steel.

The invention's head gimbal assembly 60 includes the invention's flexure finger 20 coupled to the slider 90, which further includes the invention's micro-actuator assembly 80 mechanically coupled to the slider and may further include the vertical control signal path electrically coupled to the vertical control signal of the slider. The invention's head stack assembly 50 includes at least one of the head gimbal assemblies coupled to a head stack 54. The invention's hard disk drive 10 includes a head stack assembly 50, which includes at least one of the head gimbal assemblies.

Figure 2B:
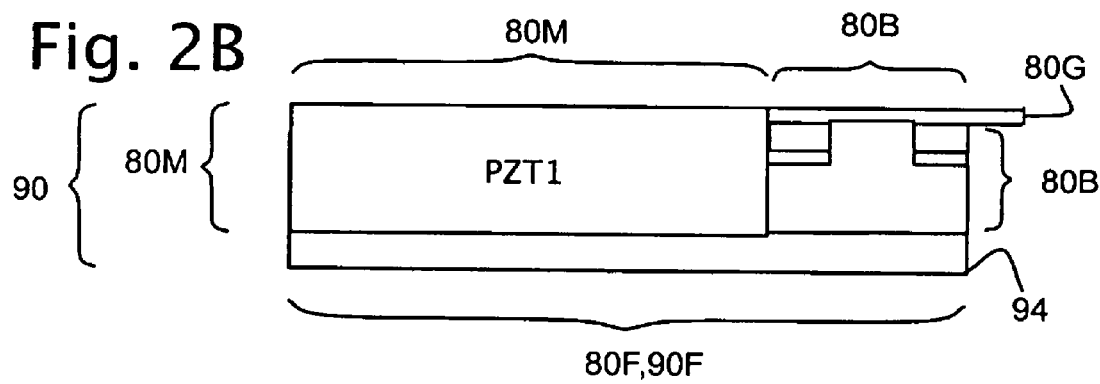
Figure 2C:
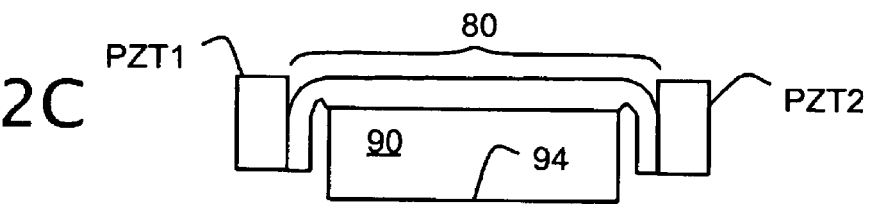
Figure 2D:
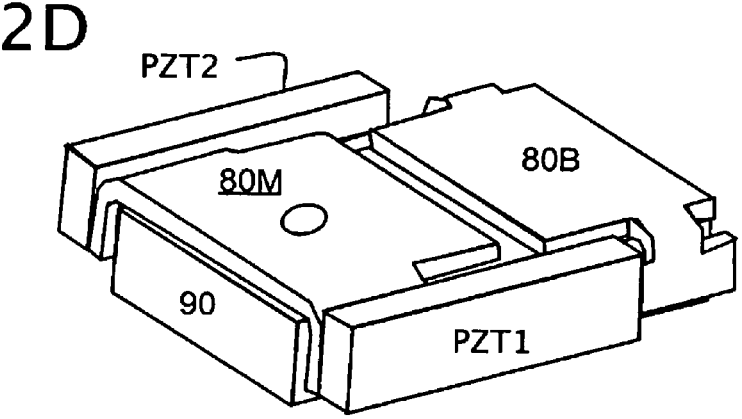
Figure 3C:
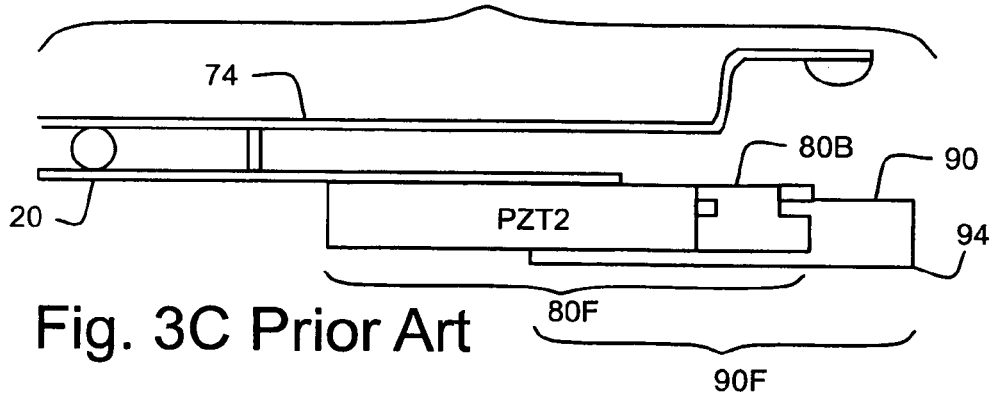
FIG. 3C shows an example of a head gimbal assembly using a prior art micro-actuator assembly.

The head gimbal assembly 60 benefits from the invention's micro-actuator 80 coupling to the slider 90 to merge the micro-actuator footprint 80F with the slider footprint 90F as shown in FIGS. 2A, 2B, and 3B, when compared to previous micro-actuators as shown in FIGS. 1A, 1B, and 3C. The head gimbal assembly also benefits from the micro-actuator bridge gap 80G. First, by enforcing the micro-actuator bridge gap, the head gimbal assembly has higher pitch and higher roll stiffness than previous head gimbal assemblies. Second, by merging the slider and micro-actuator footprints, the pitch torque of the head gimbal assembly is minimized in the hard disk drive 10.

In further detail, the head gimbal assembly 60 includes the flexure finger 20 coupled with the slider 90 and a micro-actuator assembly 80 mechanically coupling to the slider to aid in positioning the slider to access the data 122 on the rotating disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the rotating disk surface, which includes providing electrical power to the micro-actuator assembly.

The head gimbal assembly 60 may further provide the vertical control signal VcAC to the heating element 98H of the vertical micro-actuator 98, as shown in FIGS. 5 and 8B. Operating the head gimbal assembly may further preferably include driving the vertical control signal. The first micro-actuator power terminal 82P1 may be tied to the first slider power terminal SP1, and both electrically coupled to the first power path SP1P.

The head gimbal assembly 60 may further include the amplifier 96 to generate the amplified read signal ar0 using the first slider power terminal SP1 and the second slider power terminal SP2. The flexure finger 20 may further contain a read trace path rtp electrically coupled to the amplified read signal ar0, as shown in FIG. 8B. The head gimbal assembly operates as follows when read accessing the data 122, preferably organized as the track 122, on the rotating disk surface 120-1. The slider 90 reports the amplified read signal ar0 as the result of the read access.

The flexure finger 20 may be coupled to the load beam 74 as shown in FIGS. 2B and 9A, which may further include the first power path SP1P electrically coupled to a metallic portion of the load beam. In certain embodiments, the metallic portion may be essentially all of the load beam.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly. The load beam may preferably electrically couple to the slider to the first slider power terminal SP1, and may further preferably electrically couple to the micro-actuator assembly to form the first power path SP1P.

Manufacturing the invention's head gimbal assembly 60 includes coupling the flexure finger 20 to the invention's slider 90, which further includes mechanically coupling the micro-actuator assembly 80 to the slider. Coupling the flexure finger to the slider may further include electrically coupling the read trace path rtp with the amplified read signal ar0 as shown in FIG. 8B or alternatively, providing the read differential signal pair r0. Coupling the micro-actuator assembly to the slider may include electrically coupling the first micro-actuator power terminal 82P1 to the first slider power terminal SP1P and/or electrically coupling the second micro-actuator power terminal 82P2 to the second slider power terminal SP2P. The invention includes this manufacturing process and the head gimbal assembly as a product of the process. Manufacturing the invention's head gimbal assembly 60 may further include electrically coupling the flexure finger 20 to provide the vertical control signal VcAC to the slider 98.

Figure 6:
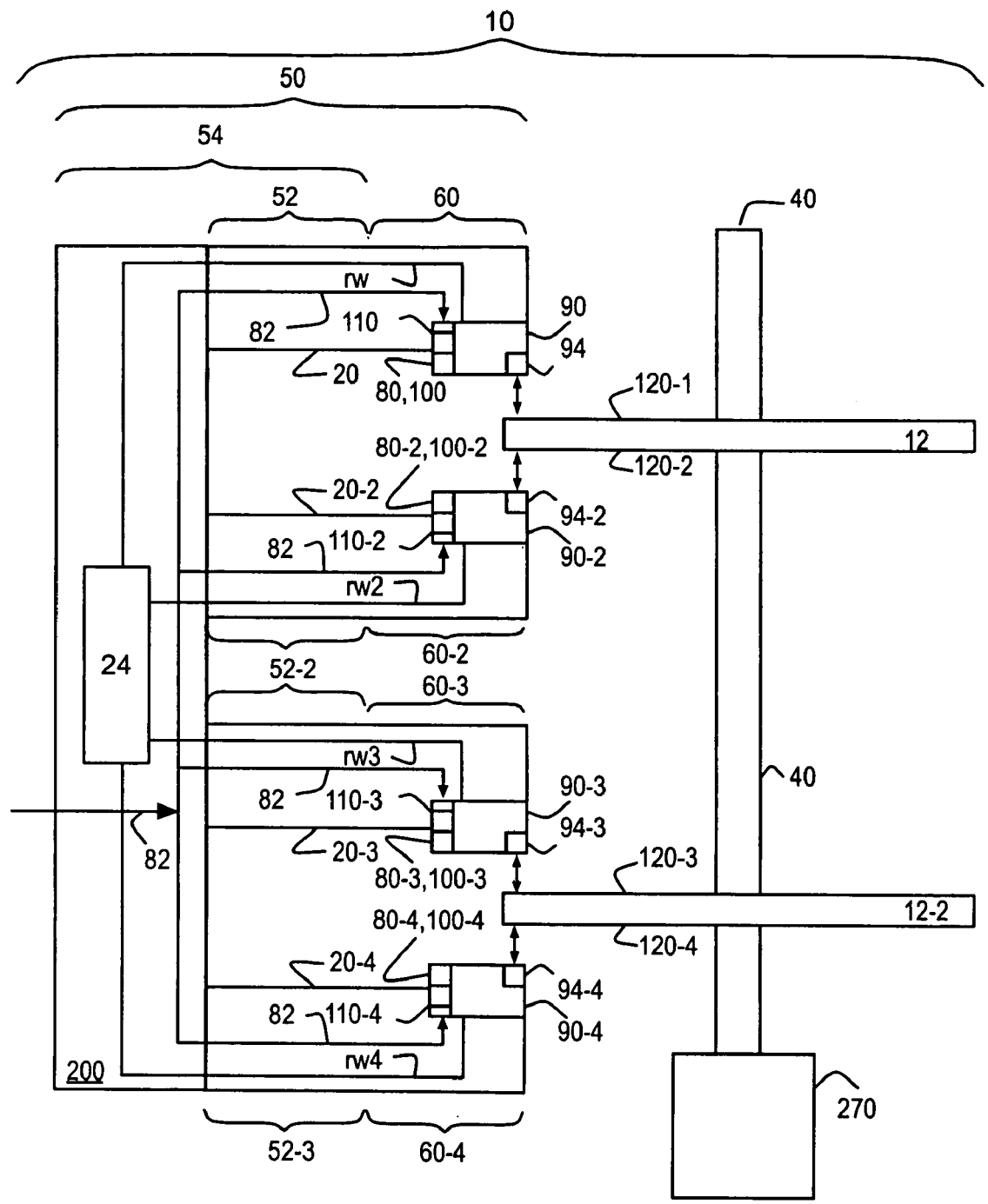
Figure 7:
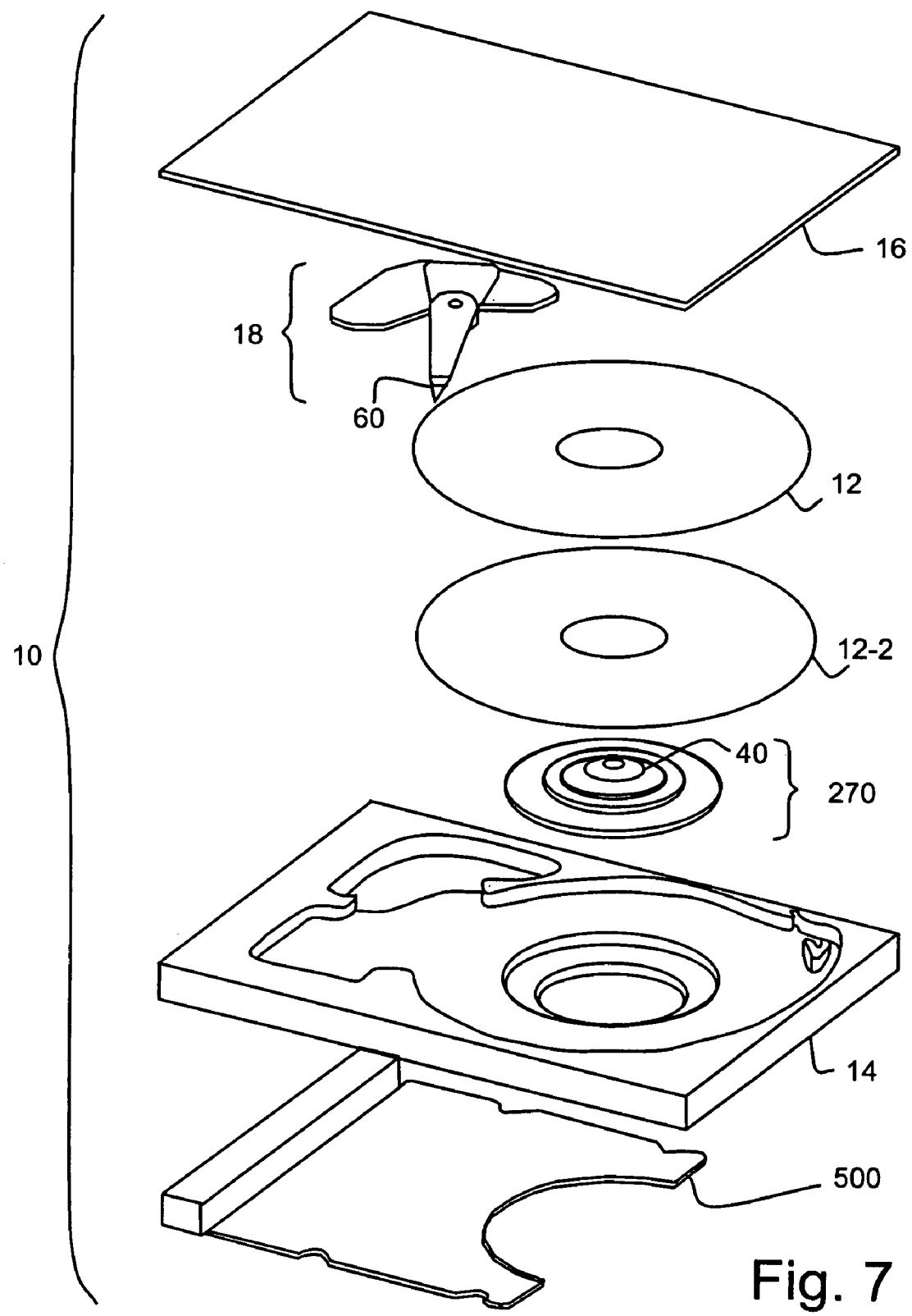

The invention also includes a head stack assembly 50 containing at least one head gimbal assembly 60 coupled to a head stack 54, as shown in FIGS. 5 and 6.

The head stack assembly 50 may include more than one head gimbal assembly 60 coupled to the head stack 54. By way of example, FIG. 6 shows the head stack assembly coupled with a second head gimbal assembly 60-2, a third head gimbal assembly 60-3 and a fourth head gimbal assembly 60-4. Further, the head stack is shown in FIG. 5 including the actuator arm 52 coupling to the head gimbal assembly. In FIG. 6, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

The head stack assembly 50 operates as follows: for each of the sliders 90 included in each of the head gimbal assemblies 60 of the head stack, when the temperature of the shape memory alloy film of the slider is below the first temperature, the film configures in a first solid phase to the deformation region 97 to create the vertical position VP of that read-write head above its rotating disk surface. Whenever the temperature of the film of the shape memory alloy is above the first temperature, the film configures in a second solid phase to the deformation region increasing the vertical position of the read-write head above the rotating disk surface.

In certain embodiments where the slider 90 includes the amplifier 96, the slider reports the amplified read signal ar0 as the result of the read access to the track 122 on the rotating disk surface 120-1. The flexure finger provides the read trace path rtp for the amplified read signal, as shown in FIG. 4B. The head stack assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal as a result of the read access.

Manufacturing the invention's head stack assembly 50 includes coupling at least one of the invention's head gimbal assembly 60 to the head stack 50 to at least partly create the head stack assembly. The process may further include coupling more than one head gimbal assemblies to the head stack. Manufacturing may further, preferably include coupling the main flex circuit 200 to the flexure finger 20, which further includes electrically coupled the preamplifier 24 to the read trace path rtp to provide the read signal 25-R as a result of the read access of the data 122 on the rotating disk surface 120-1. The invention includes the manufacturing process for the head stack assembly and the head stack assembly as a product of the manufacturing process. Coupling the head gimbal assembly 60 to the head stack 50 may further, preferably include swaging the base plate 72 to the actuator arm 52.

The invention's hard disk drive 10, shown in FIGS. 4A to 7, includes the invention's head stack assembly 50 pivotably mounted through the actuator pivot 58 on a disk base 14 and arranged for the slider 90 of the head gimbal assembly 60 to be laterally positioned LP near the data 122 for the read-write head 94 to access the data on the rotating disk surface 120-1. The disk 12 is rotatably coupled to the spindle motor 270 by the spindle shaft 40. The head stack assembly is electrically coupled to an embedded circuit 500. The data may be organized on the rotating disk surface either as a radial succession of concentric circular tracks or a radial succession of joined spiral tracks.

The hard disk drive 10 may include the servo controller 600, and possibly the embedded circuit 500, coupled to the voice coil motor 18, to provide the micro-actuator stimulus signal 650 driving the micro-actuator assembly 80, and the read signal 25-R based upon the amplified read signal ar0 contained in the read-write signal bundle rw from the read-write head 94 to generate the Position Error Signal 260.

The embedded circuit 500 may preferably include the servo controller 600, as shown in FIG. 5, which may further include a servo computer 610 accessibly coupled 612 to a memory 620. A program system 1000 may direct the servo computer in implementing the method operating the hard disk drive 10. The program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC.

The voice coil driver 30 preferably stimulates the voice coil motor 18 through the voice coil 32 to provide coarse position of the slider 90, in particular, the read head 94-R near the track 122 on the rotating disk surface 120-1.

The embedded circuit 500 may further process the read signal 25-R during the read access to the data 122 on the rotating disk surface 120-1. The slider 90 reports the amplified read signal ar0 as the result of a read access of the data 122 on the rotating disk surface 120-1. The flexure finger 20 provides the read trace path rtp for the amplified read signal, as shown in FIG. 4B. The main flex circuit 200 receives the amplified read signal from the read trace path to create the read signal 25-R. The embedded circuit receives the read signal to read the data on the rotating disk surface.

A computer as used herein may include at least one instruction processor and at least one data processor, where each of the data processors is directed by at least one of the instruction processors.

Manufacturing the hard disk drive 10 may include pivotably mounting the head stack assembly 50 by an actuator pivot 58 to the disk base 14 and arranging the head stack assembly, the disk 12, and the spindle motor 270 for the slider 90 of the head gimbal assembly 60 to access the data 122 on the rotating disk surface 120-1 of the disk 12 rotatably coupled to the spindle motor, to at least partly create the hard disk drive. The invention includes this manufacturing process and the hard disk drive as a product of that process.

Manufacturing may further include electrically coupling the invention's head stack assembly 50 to the embedded circuit 500 to provide the read signal 25-R as the result of the read access of the data 122 on the rotating disk surface 120-1. Making the hard disk drive 10 may further include coupling the servo controller 600 and/or the embedded circuit 500 to the voice coil motor 18 and providing the micro-actuator stimulus signal 650 to drive the micro-actuator assembly 80. Making the hard disk drive may further include electrically coupling the vertical control driver of the embedded circuit to the vertical control signal VcAC of the slider 90 through the head stack assembly 50, in particular through the flexure finger 20.

Making the servo controller 600 and/or the embedded circuit 500 may include programming the memory 620 with the program system 1000 to create the servo controller and/or the embedded circuit, preferably programming a non-volatile memory component of the memory. Making the embedded circuit 500, and in some embodiments, the servo controller 600, may include installing the servo computer 610 and the memory 620 into the servo controller and programming the memory with the program system 1000 to create the servo controller and/or the embedded circuit.

Looking at some of the details of FIG. 6, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the hard disk drive 10 operates as follows when accessing the data 122 on the rotating disk surface 120-1. The spindle motor 270 is directed by the embedded circuit 500, often the servo-controller 600, to rotate the disk 12, creating the rotating disk surface for access by the read-write head 94. The embedded circuit, in particular, the servo controller drives the voice coil driver 30 to create the voice coil control signal 22, which stimulates the voice coil 32 with an alternating current electrical signal, inducing a time-varying electromagnetic field, which interacts with the fixed magnet 34 to move the voice coil parallel the disk base 14 through the actuator pivot 58, which alters the lateral position LP of the read-write head of the slider 90 in the head gimbal assembly 60 coupled to the actuator arm 52, which is rigidly coupled to the head stack 54 pivoting about the actuator pivot. Typically, the hard disk drive first enters track seek mode, to coarsely position the read-write head near the data, which as stated above, is typically organized as a track. Once the read-write head is close to the track, track following mode is entered. Often this entails additional positioning control provided by the micro-actuator assembly 80 stimulated by the lateral control signal 82, which is driven by the micro-actuator driver 28. Reading the track may also include generating a Position Error Signal 260, which is used by the servo controller as positioning feedback during track following mode.

The hard disk drive 10 may operate by driving the vertical control signal VcAC to stimulate the vertical micro-actuator 98 to increase the vertical position VP of the slider 90 by providing a potential difference to the first slider terminal SP1, stimulating the heating element 98H to increase the temperature of the shape memory alloy film 98F, as shown in FIG. 1B. This operation may be performed when seeking a track 122 of data on the rotating disk surface 120-1, and/or when following the track on the rotating disk surface. As stated before, whenever the temperature of the film is below a first temperature, the film configures in a first solid phase to the deformation region 97 to create the vertical position of the read-write head above the rotating disk surface. Whenever the temperature of the film is above the first temperature, the film configures in a second solid phase to the deformation region increasing the vertical position of the read-write head above the rotating disk surface. The servo controller 600 may include means for driving the vertical control signal, which may be at least partly implemented by the vertical control driver 29 creating the vertical control signal to be provided to the vertical micro-actuator. The vertical control driver is typically an analog circuit with a vertical position digital input 290 driven by the servo computer 610 to create the vertical control signal.

Track following and track seeking may be implemented as means for track seeking and means for track following, one or both of which may be implemented at least in part as program steps in the program system 1000 residing in the memory 620 accessibly coupled 612 to the servo computer 610 shown in FIG. 5. Alternatively, the means for track seeking and/or the means for track following may be implemented as at least one finite state machine.

The preceding embodiments provide examples of the invention and are not meant to constrain the scope of the following claims.

What is claimed is:

1. A micro-actuator assembly, comprising:
   a micro-actuator mount for mechanically coupling to a slider for lateral positioning through at least one piezo-electric device of a read-write head for accessing data on a rotating disk surface in a hard disk drive; wherein said slider includes said read-write head; and
   a micro-actuator bridge (80B) coupled to said micro-actuator mount (80M) to collectively provide a micro-actuator footprint (80F) merged with a slider footprint (90F) of said slider and a micro-actuator bridge gap (80G) to said slider;
   wherein for a head gimbal assembly containing said micro-actuator assembly,
   said head gimbal assembly has a higher pitch and a higher roll stiffness than a micro-ctuator assembly without said micro-actuator bridge gap, and a pitch torque of said head gimbal assembly is reduced in a hard disk drive compared to said micro-actuator assembly with said micro-actuator footprint (80F) unmerged with said slider footprint (90F).

2. The micro-actuator assembly of claim 1, further comprising:
   a second of said piezoelectric devices for lateral position of said slider.

3. A flexure finger, comprising said micro-actuator assembly of claim 1.

4. A head gimbal assembly, comprising: said flexure finger of claim 3 coupled to said slider, further comprising:
   said micro-actuator mount mechanically coupled to said slider to create said micro-actuator footprint merged with said slider footprint and said micro-actuator bridge gap to said slider;
   wherein said head gimbal assembly has said higher pitch and said higher roll stiffness, and said pitch torque of said head gimbal assembly is reduced in said hard disk drive.

5. The head gimbal assembly of claim 4, wherein said slider includes a vertical micro-actuator stimulated by a vertical micro-actuator signal provided by said head gimbal assembly to aid in vertical positioning said slider over said rotating disk surface.

6. The head gimbal assembly of claim 4, wherein said read-write head includes a read head employing a member of the group consisting of: a spin valve and a tunneling valve.

7. The head gimbal assembly of claim 6, wherein said slider further includes an amplifier electrically coupled to said read head to create an amplified read signal in response to reading said data on said rotating disk surface.

8. A head stack assembly, comprising: at least one of said head gimbal assemblies of claim 4 coupled to a head stack.

9. The head stack assembly of claim 8, further comprising at least two of said head gimbal assemblies coupled to said head stack.

10. The hard disk drive, comprising: said head stack assembly of claim 8 pivotable mounted by an actuator pivot to a disk and configured with at least one disk rotatably mounted to a spindle motor to provide said read-write head positioned near said data on said rotating disk surface of said disk;
    wherein said pitch torque of said head gimbal assembly is reduced in said hard disk drive.

11. The hard disk drive of claim 10, wherein said data on said rotating disk surface are organized as multiple concentric tracks on said rotating disk surface.

12. A method of operating said hard disk drive of claim 11, comprising the step:
    moving said head gimbal assembly near said rotating disk surface to beneficially create said pitch of said head gimbal assembly.

13. A method of operating said hard disk drive of claim 11, comprising the step:
    moving said head gimbal assembly near said rotating disk surface to create said roll stiffness of said head gimbal assembly.

14. A method of operating said hard disk drive of claim 11, comprising the step:
    moving said head gimbal assembly near said rotating disk surface to create said pitch torque of said head gimbal assembly.

15. The hard disk drive of claim 10, wherein said data on said rotating disk surface are organized as multiple joined spiral tracks on said rotating disk surface.

16. A method of manufacturing said hard disk drive, comprising the steps: pivotaly mounting said head stack assembly of claim 8 to create said hard disk drive.

17. The hard disk drive as a product of the process of claim 16.

18. A method of manufacturing a head stack assembly, comprising the step: coupling at least one of the head gimbal assemblies of claim 4 to a head stack to create said head stack assembly.

19. The head stack assembly as a product of the process of claim 18.

\* \* \* \* \*